K. K. McLEOD.
EXHAUST PUMP FOR MILKING MACHINES.
APPLICATION FILED JAN. 4, 1915.

1,169,980.

Patented Feb. 1, 1916.

Witnesses:
Theo. Lagaard.
H. A. Bowman.

Inventor:
Kenneth K. McLeod.
By F. A. Whiteley
his Attorney.

UNITED STATES PATENT OFFICE.

KENNETH K. McLEOD, OF ST. PAUL, MINNESOTA.

EXHAUST-PUMP FOR MILKING-MACHINES.

1,169,980.   Specification of Letters Patent.   Patented Feb. 1, 1916.

Application filed January 4, 1915.   Serial No. 403.

*To all whom it may concern:*

Be it known that I, KENNETH K. McLEOD, a citizen of the United States, residing at St. Paul, in the county of Ramsey and State of Minnesota, have invented certain new and useful Improvements in Exhaust-Pumps for Milking-Machines, of which the following is a specification.

My invention relates to exhaust pumps for milking machines, and has for its object to provide means for controlling the vacuum created by the pump so that the same may be effective to produce a good milking action and at the same time may be regulated so as not to injure the cow.

It is also the object of my invention to provide an exhaust pump mechanism which shall furnish the desired vacuum at a relatively small cost of power.

The full objects and advantages of my invention will appear in connection with the detailed description thereof and are particularly pointed out in the claims.

Figure 1:
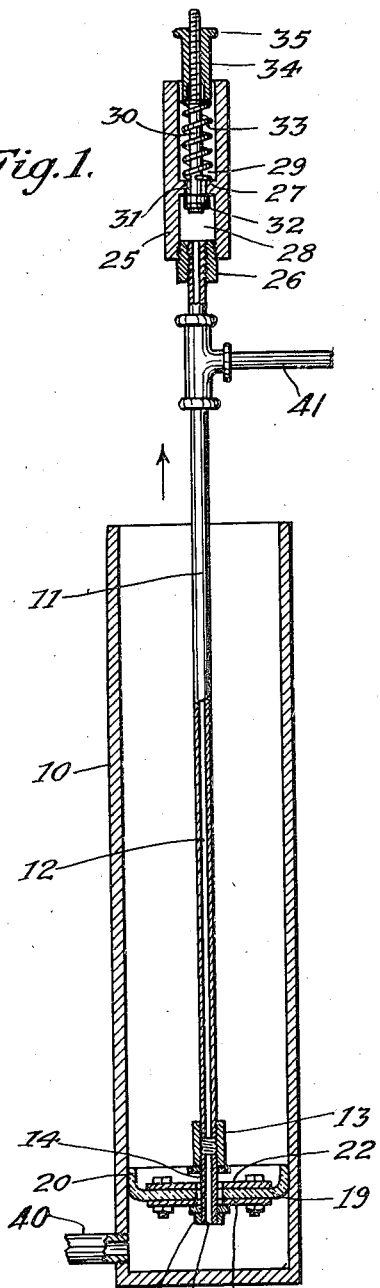
Figure 3:
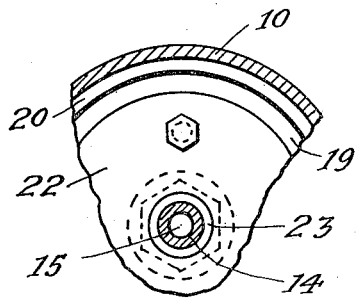
Figure 2:
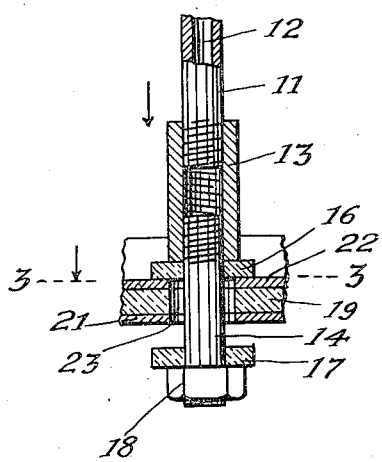

In the drawings, illustrating the application of my invention in one form,—Figure 1 is a sectional view of a pump cylinder and piston provided with my improvements. Fig. 2 is an enlarged fragmentary sectional view of some parts shown in Fig. 1. Fig. 3 is a sectional view on line 3—3 of Fig. 2.

As illustrated, the cylinder 10 is of the open-ended, valveless type and is provided with a suction inlet 40. The piston rod 11 is tubular and is provided with a projection 41 by which it is given reciprocating motion from power means not shown in the drawing. The aperture 12 in said piston rod opens into a collar 13 into which the rod 11 is threaded. A short tubular extension 14, similar to piston rod 11, is also threaded into collar 13 and the bore 15 of extension 14 provides a continuation of bore 12 which opens in effect from the lower end of piston rod 11. The extension 14 has thereon a pair of washers or valve seats 16 and 17 which are held in fixed position upon the extension 14, an end 18 threaded on the lower portion of said extension preventing the washer 17 from being withdrawn. The washers 16 and 17 may be formed of leather or other suitable material, as desired. The piston comprises a leather disk 19 having a turned-up flange 20 secured between two metal plates 21 and 22. This piston is provided with a central aperture 23 of larger diameter than the piston rod 11 or extension 14, and the extension 14 passes through the aperture 23 so that the piston is positioned upon such extension between the washer seats 16 and 17. It follows that whenever the piston is in engagement with one or the other of said seats 16 or 17 the interior of the cylinder below the piston will be sealed. During the period, however, when the piston rod, and particularly the extension 14 thereof, moves through the piston to change the seat, the interior of the cylinder below the piston will be open to the atmosphere, thus allowing the vacuum of the air compression to be momentarily relieved at the point of changing stroke. In the use of this kind of a pump for milking purposes the alternate action of air suction and air compression is involved and a quick change from one to the other is desirable. If the expansion of the air following the completion of a compression stroke is first permitted, it follows that the return or suction stroke will not immediately become effective. The same is true of the change from the suction stroke to the compression stroke. But, by the means herein described, at the moment of change either from compression to exhaust, or from exhaust to compression, the interior of the cylinder is permitted to come to atmospheric pressure, so that each stroke is at once effective, and effective throughout its length for compressing and exhausting respectively.

In the use of suction mechanism for milking purposes a serious difficulty has been encountered in that the degree of vacuum required varies very much for different cows, and particularly because if the vacuum employed is excessive for any particular cow it may result in serious injury to the cow. For this reason I have found it desirable to provide means for regulating the vacuum. And this is particularly essential where, as in the practice of my invention, the effective suction stroke begins at the moment of the return reciprocation of the piston, that is, where the interior of the cylinder below the piston has been reduced to atmospheric pressure before the beginning of the suction stroke. To accomplish this I connect upon the end of the tubular piston rod above referred to a release valve mechanism. This comprises a casing 25 which is threaded upon a collar 26 that in turn is threaded upon the end of piston rod 11. The casing comprises a diaphragm or central partition 27 dividing the interior of the casing into a lower chamber 28 in communication with bore 12 and an upper chamber 29. A stem 30 extends through an aperture 31 in the partition 27, which aperture is of larger diameter than the stem 30. A valve head 32 is provided upon the lower end of stem 30 and is held in engagement with partition 27 so as to close aperture 31 by means of a coil spring 33 engaging partition 27 and the lower end of a sleeve 34 threaded upon stem 30. The sleeve 34 extends outside of the cavity or chamber 29 and has a hand knurled head 35 on the end of the same by means of which the tension of spring 33 may be regulated. The operation of this mechanism will be sufficiently apparent. During the suction stroke if the difference in pressure inside and outside of the cylinder below the piston becomes greater than the force of spring 33, such spring will yield and the piston 32 will uncover aperture 31 so as to admit air through bores 12 and 15 to the inside of the cylinder. By regulating the tension of the spring 33 the degree of vacuum may be absolutely controlled and may be made exactly right to accomplish the most efficient milking action. With the use of this arrangement the full effect of the suction or exhaust stroke made possible by the piston construction above employed, may be safely applied to any cow for milking purposes.

I claim:

1. A suction pump for milking machines comprising a cylinder, a piston in said cylinder operative to compress air in one direction of movement and exhaust air in the other direction of movement within said cylinder, and means for permitting the air within the cylinder below the piston to return to atmospheric pressure at the time of change of direction of each stroke.

2. A suction pump for milking machines comprising a cylinder, a piston rod in said cylinder having a pair of valve seats thereon suitably spaced one from the other, and a piston on the piston rod movable between the valve seats and having an aperture adapted to be closed when said piston is in engagement with either of said valve seats, said aperture being open during the period of transit.

3. A suction pump for milking machines comprising a cylinder, a piston in said cylinder operative to compress air in one direction of movement and exhaust air in the other direction of movement within said cylinder, means for permitting the air within the cylinder below the piston to return to atmospheric pressure at the time of change of direction of each stroke so that the compression stroke and the exhaust stroke may be operative throughout the full length thereof, and means for admitting air into the cylinder during the exhaust stroke to limit the suction force thereof.

4. A suction pump for milking machines comprising a cylinder, a piston rod in said cylinder having a pair of valve seats thereon suitably spaced one from the other, said piston rod being tubular and opening through the end thereof into the cylinder, a piston on the piston rod movable between the valve seats and having an aperture adapted to be closed when said piston is in engagement with either of said valve seats, said aperture being open during the period of transit so that the compression stroke and the exhaust stroke of said piston will be operative through the full length thereof, and a valve on said piston rod for admitting air therethrough and into the cylinder below the piston during the exhaust stroke to limit the suction force of said exhaust stroke.

5. A suction pump for milking machines comprising a cylinder, a piston in said cylinder operative to compress air in one direction of movement and exhaust air in the other direction of movement within said cylinder, a hollow piston rod for said piston opening into the cylinder below the piston, a valve in said piston rod for admitting air into the cylinder during the exhaust stroke of the piston to limit the suction force of said stroke, a spring for controlling said valve, and means to regulate the force of the spring so as to control the degree of suction pressure at which the valve will operate.

In testimony whereof I affix my signature in presence of two witnesses.

KENNETH K. McLEOD.

Witnesses:
F. A. WHITELEY,
H. A. BOWMAN.